United States Patent
Wu (10) Patent No.: US 10,270,710 B2
(45) Date of Patent: *Apr. 23, 2019

(54) NETWORK CONTROL TO IMPROVE BANDWIDTH UTILIZATION AND PARAMETERIZED QUALITY OF SERVICE

(71) Applicant: Entropic Communications, LLC, Carlsbad, CA (US)

(72) Inventor: Zong Liang Wu, San Diego, CA (US)

(73) Assignee: Entropic Communications, LLC, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/109,396

(22) Filed: Aug. 22, 2018

(65) Prior Publication Data

US 2018/0367470 A1 Dec. 20, 2018

Related U.S. Application Data

(63) Continuation of application No. 15/045,674, filed on Feb. 17, 2016, now Pat. No. 10,091,133, which is a
(Continued)

(51) Int. Cl.
*H04L 12/927* (2013.01)
*H04L 12/28* (2006.01)
*H04L 12/801* (2013.01)

(52) U.S. Cl.
CPC ........ *H04L 47/805* (2013.01); *H04L 12/2801* (2013.01); *H04L 12/2803* (2013.01);
(Continued)

(58) Field of Classification Search
CPC ............. H04L 12/2801; H04L 12/2809; H04L 12/2834; H04L 12/2861; H04L 12/2865; H04L 12/2898; H04L 47/805; H04L 47/10

See application file for complete search history.

(56) References Cited

U.S. PATENT DOCUMENTS 8,345,553 B2 * 1/2013 Ohana ................ H04L 12/2801
370/235
8,584,187 B2 11/2013 Udani
(Continued)

FOREIGN PATENT DOCUMENTS

CN 1640031 A 7/2005
EP 1315340 A2 10/2005
(Continued)

OTHER PUBLICATIONS

Chinese Patent Office, Second Office Action in Application No. 201180031267.1, dated Aug. 19, 2015 (18 pgs).
(Continued)

*Primary Examiner* — Mewale A Ambaye
(74) *Attorney, Agent, or Firm* — McAndrews, Held & Malloy, Ltd.

(57) ABSTRACT

Systems and methods for scheduling network communications in a managed network can include a Network Controller discovering a plurality of network nodes; the Network Controller classifying the discovered network nodes into two or more classifications of node for node-level prioritization of network communications; the Network Controller receiving reservation requests from at least some of the plurality of network nodes, wherein the reservation requests request one or more time slots for their respective network nodes in an upcoming communication window; and the Network Controller assigning time slots in the upcoming communication window to one or more network nodes in response to reservation requests, wherein the assignment is based on a priority of the network nodes and wherein the priority is assigned to the nodes according to their classification.

20 Claims, 8 Drawing Sheets

Related U.S. Application Data continuation of application No. 12/822,676, filed on Jun. 24, 2010, now Pat. No. 9,294,297.

(52) U.S. Cl.
CPC ...... *H04L 12/2809* (2013.01); *H04L 12/2861* (2013.01); *H04L 12/2865* (2013.01); *H04L 12/2898* (2013.01); *H04L 47/10* (2013.01)

(56) References Cited

U.S. PATENT DOCUMENTS

| | | |
|---|---|---|
| 9,294,297 B2 | 3/2016 | Wu |
| 2002/0126692 A1 | 9/2002 | Haartsen |
| 2003/0072264 A1 | 4/2003 | Mo et al. |
| 2003/0115310 A1 | 6/2003 | Klotsche |
| 2003/0135553 A1 | 7/2003 | Pendakur |
| 2004/0184477 A1 | 9/2004 | Tavli et al. |
| 2005/0235011 A1 | 10/2005 | Minium et al. |
| 2005/0276231 A1 | 12/2005 | Ayyagari |
| 2008/0192752 A1* | 8/2008 | Hyslop ............ H04W 74/06 370/395.21 |
| 2008/0212591 A1 | 9/2008 | Wu et al. |
| 2008/0298241 A1 | 12/2008 | Ohana et al. |
| 2009/0109977 A1* | 4/2009 | Valluru ............ H04W 28/16 370/395.21 |
| 2010/0082791 A1* | 4/2010 | Liu ............ H04L 12/56 709/223 |

FOREIGN PATENT DOCUMENTS

| | | |
|---|---|---|
| WO | 02073898 A2 | 9/2002 |
| WO | 2008101112 A2 | 8/2008 |

OTHER PUBLICATIONS

Int'l Search Report and Written Opinion for PCT/US2011/040844 dated Oct. 20, 2011 (8 pgs).
Extended European Search Report for EP Appln. No. 11798673.7 dated Jul. 3, 2014 (9 pgs).

* cited by examiner

NETWORK CONTROL TO IMPROVE BANDWIDTH UTILIZATION AND PARAMETERIZED QUALITY OF SERVICE

The present application is a continuation of application Ser. No. 15/045,674, filed on Feb. 17, 2016, which is a continuation of application Ser. No. 12/822,676, filed on Jun. 24, 2010 (U.S. Pat. No. 9,294,297). Each of the aforementioned applications is incorporated herein by reference in its entirety.

TECHNICAL FIELD

Description of the Related Art

A home network may include several types of devices configured to deliver subscriber services throughout a home. These subscriber services include delivering multimedia content, such as streaming audio and video, to devices located throughout the home. As the number of available subscriber services has increased and they become more popular, the number of devices being connected within each home network has also increased. The increase in the number of services and devices increases the complexity of coordinating communication between the network nodes. This increase also generally tends to increase the amount of traffic carried on the network.

Figure 1:
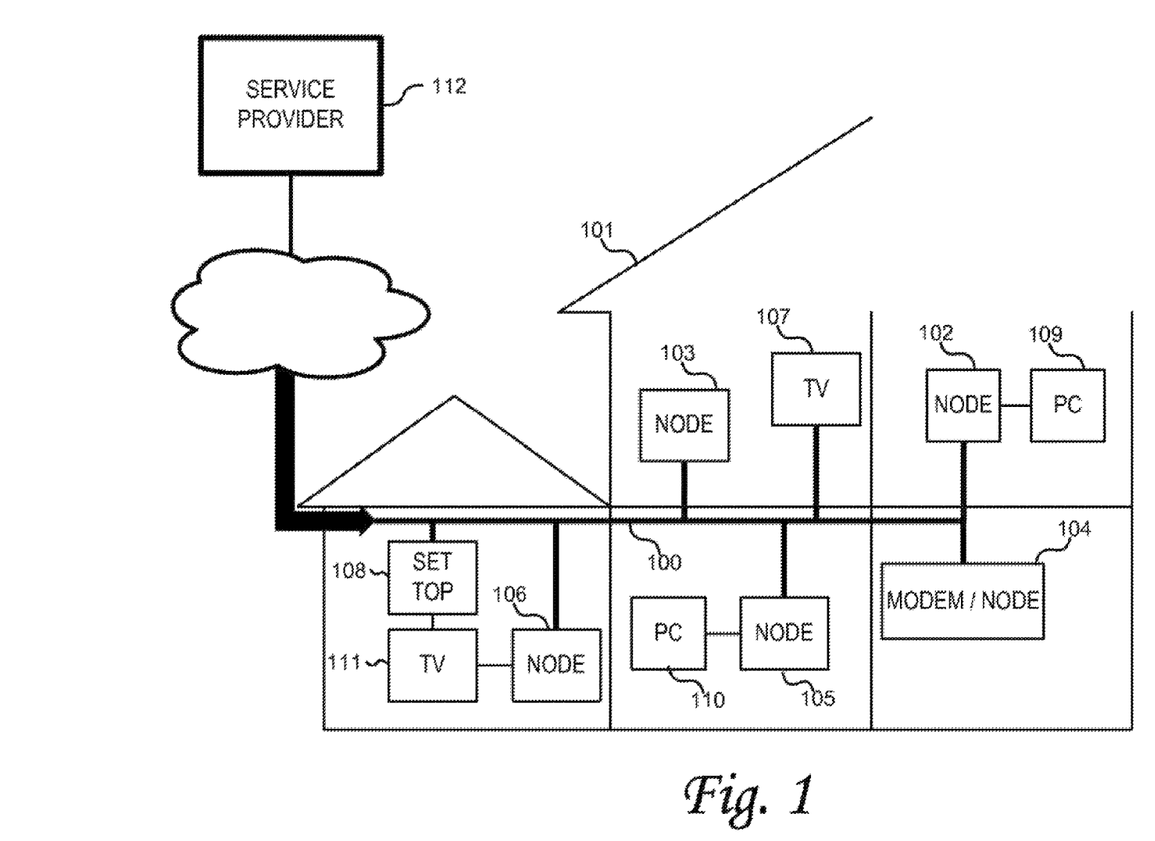
FIG. 1 illustrates an example of one environment in which some embodiments of the disclosed method and apparatus may be implemented.

The network of FIG. 1 is one example of a Multimedia over Coax Alliance (MoCA) network implemented in a home. In this example, a wired communications medium 100 is shown. The wired communications medium might be a coaxial cable system, a power line system, a fiber optic cable system, an Ethernet cable system, or other similar communications medium. Alternatively, the communications medium might be a wireless transmission system. In the embodiment of FIG. 1A, the communications medium 100 is preinstalled coaxial cabling deployed within a residence 101.

The network of FIG. 1 comprises a plurality of network nodes 102, 103, 104, 105, 106 in communication according to a communications protocol. For example, the communications protocol might conform to a networking standard, such as the well known MoCA standard. In the example of FIG. 1, the communications protocol specifies a packet based communications system.

In some cases, activity on the network is controlled by a Network Coordinator (NC). In such networks, the NC manages access to the shared communications medium and manages the "quality-of-service" of transmissions on the network. In one such case, one of the nodes is selected to perform the functions of the NC based upon a process defined by the communications protocol. For example, in a MoCA network, the first node to communicate over a communication medium will search to see whether any other node is already performing the functions of the NC. Being the first node, there will not be another node yet on the network. Accordingly, the first node will become the NC. When a second node does a similar search, the first node will be sending out a beacon that will be detected by the second node. An admission process will occur between the nodes according to the admission procedures of the MoCA protocol. The result of the admission process will be the admission of the second node to the network created by the first node. The NC also performs admission procedures when any other new node requests admission to the network. After one or more nodes join the network, a protocol is used to select one of the nodes to become the new NC by using a set of well defined criteria.

In networks employing an NC, the NC schedules network communications between network nodes using a Media Access Plan (MAP). The MAP is sent as a packet. Such MAP packets are sent on a regular basis. MAPs schedule all of the traffic on the medium 100. That includes scheduling the times during which nodes can transmit. Transmit times for data packets are scheduled by the NC in response to reservation requests (RRs) by the nodes of the network. The NC may also schedule control and management packets on its own (without prior RRs).

With continued reference to FIG. 1, a node 102 serves as a network communications module (e.g., a MoCA node) and is coupled to one of the computers 109. Such nodes allow the computers 109 to communicate on the communications medium 100 in accordance with the communications protocol used on the medium 100. A node 106 is shown as a module associated with a television 111 to allow the television to receive and display media streamed from one or more other network nodes. Alternatively, a node might be associated with (i.e., coupled to or integrated into) a speaker or other music or video device 103. A node might also be associated with a module configured to interface with an internet or cable service provider 112, for example to provide Internet access, digital video recording capabilities, media streaming functions, or network management services to the residence 101.

Referring once again to MoCA as an example, a MoCA network utilizes a centralized NC to set up network communications among nodes. Each unidirectional traffic stream of data packets is identified by a "Flow ID." For the purposes of this disclosure, a "flow" is a communication of information organized as a stream of packets transmitted between a transmitting node and at least one receiving node. A flow will typically include a set of related information to be communicated from the transmitting node to the receiving node. The information may be a digital stream of data representing the entire content of a movie to be displayed on a television or other video monitor. The entire stream of data used to stream the movie may be associated with one flow. As such, a unique flow ID will be assigned to the flow and will be associated with all of the packets required to be transmitted from a transmitting node 102 to the receiving node 106 to stream the content of the movie to the receiving node 106 (i.e., all of the packets of the flow).

The transmitting node 102 may set up as many flows as the node 102 requires to communicate with the other nodes of the network. For example, a second flow may be concurrently set up between the node 102 and another node 105 to allow a document to be sent from the personal computer 109 to the personal computer 110.

Some home networks specify quality of service (QoS) parameters to ensure that an appropriate priority is set for the communications that occur on the network. QoS parameters can also be used to ensure that sufficient resources are allocated to the communication of user content without undesirable interruptions or delays. For example, a user that is playing a video game will only have a desirable experience if the commands that he provides are communicated to the game console and then displayed on the monitor or television rapidly. Delays in implementing such gaming commands can significantly impair the quality of the experience. Accordingly, the use of QoS parameters and protocols can help ensure a satisfactory user experience while ensuring that resources are not unnecessarily expended on communicating information more rapidly than is necessary if the content has a high tolerance for latency (i.e., delay).

In a home network, QoS can be classified into two main categories: Parameterized QoS (PQoS) and Prioritized QoS. Parameterized QoS, or PQoS, provides a quantified measure of quality which is defined by a "Traffic Specification" (TSPEC) for each flow. The TSPEC of a PQoS flow defines the requirements and parameters of the flow. The TSPEC of a PQoS flow typically includes information like Peak Rate, Maximum Packet Size, etc. For example, in a MoCA network in which PQoS is implemented, the Peak Rate parameter indicates the maximum amount of data (in bytes) that will need to be transmitted in a very short time interval (like a MAP cycle). Each Parameterized QoS flow must first go through a formal PQoS flow admission process before the flow is allowed to start any data packet transmission. The PQoS flow admission process allows all the nodes involved in the flow to reserve appropriate node level resources (like buffers) and network level resources (like network transmission time and timeliness of such transmissions), in order to guarantee the QoS (that the parameters associated with the TSPEC can be met). Once a PQoS flow is "admitted," the resources necessary to transmit the entire flow from the transmitting node to one or more receiving nodes timely are guaranteed. If a PQoS flow is rejected after the PQoS flow admission process, the PQoS flow cannot be started. On the other hand, for Prioritized QoS, there is no admission process. Each Prioritized QoS flow is assigned a priority by the node sending the flow. Assigning a priority merely places the flow in a priority group. Those flows that are in the group having the highest priority will be allowed to transmit before flows that are in group having a relatively lower priority. However, unlike PQoS flows, prioritized QoS flows are not guaranteed to get the resources necessary to ensure that packets of the flows are transmitted.

Only PQoS flows must go through the PQoS flow admission process to ensure that sufficient network bandwidth and node level resources are reserved for them. This ensures that that the resources required by the PQoS flows will be available when needed during the actual data packet transmission phase. The data packet transmission phase of a PQoS flow is the phase during winch the transmit node actually makes RRs for individual data packets or groups of data packets of the flow. In addition, during the data packet transmission phase an RR is "granted" (i.e., scheduled) or discarded by the NC, depending on the availability of network bandwidth for this request. It should be noted that for the purpose of this description, "grants the request" means that the NC assigns a transmission slot to the packet associated with the RR to allow the node that generated the request to transmit the associated packet during the assigned transmission slot in the next MAP cycle. The NC then transmits a MAP to indicate the schedule to all of the nodes of the network, including the requesting node. Each requesting node then transmits the packets according to the schedule indicated by the MAP. Further details regarding MAPs and RRs are provided below.

The data packet transmission phase of a PQoS flow can start only after the PQoS flow admission phase is successful. Since resources are not guaranteed to other (i.e., Prioritized) QoS flows, a node can always down-grade a rejected PQoS flow to a Prioritized QoS flow, and start transmitting the flow with Prioritized QoS level.

Among PQoS flows, each flow may be assigned a priority (similar to a prioritized QoS flow) in order to create further differentiation among the various PQoS flows. However, even if assigned a low relative priority, PQoS flows will always be transmitted before non-PQoS flows, such as prioritized QoS flows, if the bandwidth reserved for PQoS flows has not been completely used by other PQoS flows. If there is insufficient bandwidth reversed for PQoS flows to transmit all of the PQoS packets to transmitted, then those packets associated with PQoS flows that have higher priorities will be transmitted first. Because admitted PQoS flows are guaranteed, the NC must determine whether it can ensure delivery of all packets of a PQoS flow immediately following an RR. Therefore, the NC reserves a relatively large amount of bandwidth for each PQoS flow that is admitted.

The MoCA network is temporally divided into cycles referred to as MAP cycles. The MAP cycles are divided into time slots. During each MAP cycle, the NC transmits a MAP packet that indicates which nodes will transmit during each time slot of the next MAP cycle (including which slot in the next MAP cycle will contain the next MAP packets. Accordingly, a given MAP cycle includes the communication activity on the channel under the control of the previously sent MAP. That is, each MAP schedules all of the communication activity for the next MAP cycle communication window.

The MAP determines the following information for each packet to be sent in the next MAP cycle: i) packet start time; ii) packet duration; iii) source node; and iv) destination node(s). The combination of a packet start time, the packet duration for the packet to be sent at that start time, and the source node and destination node(s) for that packet are referred to herein as a "transmission slot assignment." It should be noted that as provided herein, packet length is the number of bytes in a packet and packet duration is the amount of time required to transmit that number of bytes.

One particular type of packet that the MAP is responsible for scheduling is the previously discussed RR. Each RR may contain one or more Reservation Request Elements (RREs). Each RRE communicates information regarding a desire on the part of the node from which the RR was sent to transmit one MoCA packet containing one or more Ethernet packets. A MoCA packet can contain more than one Ethernet packet through a process called Aggregation.

From this, it can be seen that RRs are sent by client nodes (i.e. transmit nodes) to indicate that the corresponding client nodes have packets that they wish to send and thus to request that the NC schedule one or more time intervals during a subsequent MAP cycle when the client nodes can send those packets. Accordingly, when the next packet or set of packets of a flow are ready for transmission, the client node waits for the NC to allocate a time when the client node can send an RR. Once the NC has allocated this time, the client node communicates the RR to the NC at the time allocated (i.e., at the packet start time and for the packet length indicated by the MAP). Note that, in some systems, an Orthogonal Frequency Division Multiple Access (OFDMA) or like scheme can be used to allow multiple simultaneous transmissions on a separate group of subcarriers. Therefore, in some applications RRs are transmitted at the same time by different requesting nodes.

Figure 2:
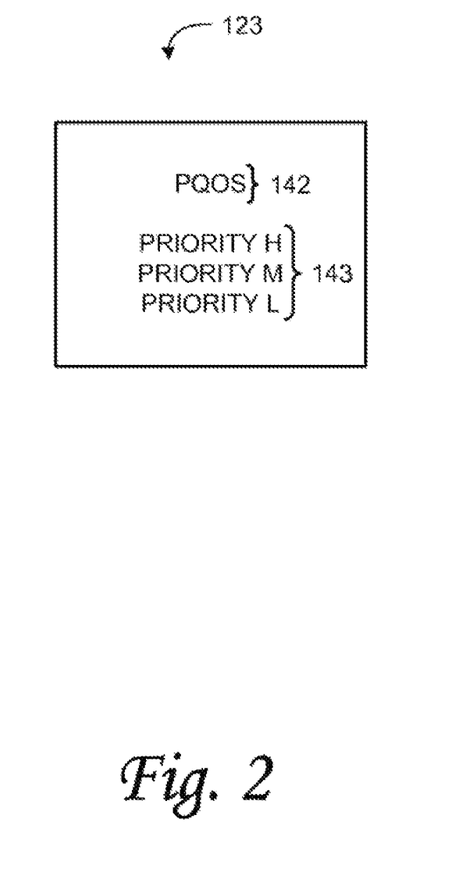
FIG. 2 is a diagram illustrating a relative priority order for network transmissions in a MoCA environment.

The RR allows a client node to communicate to the NC that the client node has data packers it wishes to send. Furthermore, the RR indicates the associated destination node(s), packet length (from which the packet duration can be determined), packet priority. Flow ID and so on for those data packets. The NC uses this information to schedule (or assign) "transmission slots" during which the client node can transmit those data packets it wishes to send. The NC then communicates that schedule by generating and transmitting the MAP having transmission slot assignments for the next MAP cycle. A non-PQoS (i.e. Prioritized QoS) RRE is one for a non-PQoS flow, white a PQoS (i.e. Parameterized QoS) RRE is one for a PQoS flow. Any RRE that the NC cannot schedule in the next MAP cycle is discarded and must be retransmitted by the node from which it originated. In allocating the available transmission slots to the requesting nodes, the NC considers the relative priority of the various transmissions. FIG. 2 is a diagram illustrating a relative priority order 123 for network transmissions. As shown in FIG. 2, PQoS 142 flows are given the highest priority and available network bandwidth is allocated first to PQoS flows 142 in the MAP cycle, if any. Next, QoS flows 143 are scheduled. In the example illustrated in FIG. 2, the QoS flows 143 are prioritized at three levels, high, medium and low priority. In such instances, the NC schedules the QoS flows 143 in accordance with their designated priorities. QoS flows can be prioritized, for example, using VLAN tags as described in further detail below.

In order for the NC to guarantee that all admitted PQoS flows will have all of the resources that are required, the NC must determine how much bandwidth will be required by each PQoS flow and within what latency limit. It should be understood that in a network supporting PQoS, and PQoS flow is guaranteed to be sent within a relatively short predetermined amount of time (typically some milliseconds), regardless of the priority assigned to the PQoS flow, once the PQoS is admitted into the network (e.g., by the NC and other nodes involved in this flow). The NC determines how much bandwidth is required by evaluating the set of parameters provided in the TSPEC of the flow. As noted above, the TSPEC typically includes the maximum packet size, peak rate, etc. Typically a network supporting Parameterized QoS uses up to a given percentage of total network capacity for supporting PQoS flows. For example, an NC can reserve 80% of the transmission slots within each MAP cycle for assignment to PQoS flows. By determining how much bandwidth is required for a new PQoS flow and how much has been reserved for existing PQoS flows, the NC can determine if it has enough capacity to admit the new PQoS flow. Once a new PQoS flow is admitted, the NC is committed to ensuring that there is sufficient bandwidth available for the new PQoS flow.

For standard QoS service, tags are used to identify the relative priority of the flows. One example of this is a VLAN tag. A VLAN tag is a field inserted into an Ethernet packet. A Priority field in the VLAN tag indicates the priority of the packet. Another example of tagging is the Differentiated Services Code Point (DSCP) field in the IP header of an Ethernet packet. However, in current home networking applications it is possible to encounter situations where traffic remains untagged or where traffic is improperly tagged. Therefore, QoS can be difficult to manage using tags and it can be difficult for a MoCA network to guarantee a particular QoS level to a node or nodes.

Additionally, in some applications it may be desirable to provide a higher level of service to certain nodes. For example, nodes that stream video on demand will typically require a higher level of service to provide seamless video streaming, while background downloads may allow a lower level of service without noticeable detriment. As another example, a service provider may want to guarantee that its branded nodes provide a higher level of service than other unbranded nodes.

SUMMARY

In one embodiment of the disclosed method and apparatus, a method and apparatus are provided for scheduling network communications in a managed network having a Network Controller and a plurality of associated network nodes. In various embodiments, the scheduling operation includes the operations of: the Network Controller discovering the plurality of network nodes; the Network Controller classifying the discovered network nodes into two or more classifications of node for prioritization of network communications; the Network Controller receiving reservation requests from at least some of the plurality of network nodes, wherein the reservation requests request one or more time slots for their respective network nodes in an upcoming communication window; and the Network Controller assigning time slots in the upcoming communication window to one or more network nodes in response to reservation requests, wherein the assignments are based on a priority of the network nodes and wherein the priority is assigned to the nodes according to their classification.

In some embodiments, the Network Controller assigning time slots in the upcoming communication window to one or more network nodes includes the operations of: identifying one or more reservation requests from node or group of network nodes belonging to a classification having a highest priority from among the two or more classifications; and assigning one or more timeslots in the upcoming communication window to the node or group of nodes belonging to the classification having the highest priority.

The Network Controller assigning time slots in the upcoming communication window to one or more network nodes further includes, in some embodiments, the step of, after assigning one or more timeslots in the upcoming communication window to the first network node or group of network nodes having the highest priority, assigning remaining timeslots, if any, in order of node priority to one or more network nodes having a lower priority. In various embodiments, timeslots are assigned to network nodes on a prioritized basis without relying on VLAN tags to prioritize assignments.

The Network Controller assigning time slots in the upcoming communication window to one or more network nodes can further include allocating the one or more time slots assigned to the first network node or group of network nodes having the highest priority to one or more of a plurality of flows of that node based on relative priorities of said flows.

In one embodiment, the Network Controller admits one or more PQoS flows for a network node having the highest priority among the network nodes.

In various embodiments, classifying of the nodes is performed based on either the functional type or the provider of the node. The node functional types can include a Digital Video Recorder (DVR), a Set-top Box (STB), an Ethernet to MoCA (or Coax) Bridge (ECB), a Video-on-Demand (VoD) node, a Broadband Home Router (BHR). The node providers can include a Multiple Services Operator (MSO) node, or a non-MSO node (i.e. a retail node).

In further embodiments, the Network Controller assigning time slots in the upcoming communication window to one or more network nodes further comprises allocating timeslots assigned to a group of nodes in a given classification among the nodes in that group. In some embodiments, allocating timeslots among nodes comprises allocating time slots on a round-robin basis or allocating timeslots based on relative priorities of the nodes within that group.

Other features and aspects of the disclosed method and apparatus will become apparent from the following detailed description, taken in conjunction with the accompanying drawings, which illustrate, by way of example, the features in accordance with embodiments of the disclosed method and apparatus. The summary is not intended to limit the scope of the claimed invention, which is defined solely by the claims attached hereto.

BRIEF DESCRIPTION OF THE DRAWINGS

The disclosed method and apparatus is described in detail with reference to the following Figures. The drawings are provided for purposes of illustration only. Accordingly, these drawings are provided to facilitate the reader's understanding of the disclosed method and apparatus and shall not be considered limiting of the breadth, scope, or applicability of the claimed invention. It should be noted that for clarity and ease of illustration these drawings are not necessarily made to scale.

The Figures are not intended to be exhaustive or to limit the claimed invention to the precise form disclosed. It should be understood that the disclosed method and apparatus can be practiced with modification and alteration, and that the claimed invention should be limited only by the claims and the equivalents thereof.

DETAILED DESCRIPTION

According so various embodiments of the disclosed method and apparatus, nodes on a network (also referred to as network devices) are prioritized relative to one another for network transmissions. In further embodiments, priorities within one or more network nodes are used in conjunction with node priorities among nodes to form a hierarchical priority scheme for network communications. Accordingly, in some embodiments a NC evaluates node priorities as well as flow priorities within network nodes in scheduling communications for a MAP cycle in response to RRs. More particularly, in one embodiment, 2 or more priority levels are defined at the network level for network nodes. The various flows handled by each node can further be assigned a priority relative to other flows for that node. With this hierarchical priority scheme, reservations can be granted to the highest priority node or nodes first, and the reservations for that highest priority node granted to flows for that node in order of flow priority, if assigned. Within a group of nodes having the same priority, the grants are on made on a round robin basis or based on relative priorities among those nodes. Reservations can then be granted to the next-highest priority node or nodes, and the reservations for a given next-highest priority node assigned to flows for that node according to individual flow priorities, if any.

Figure 3:
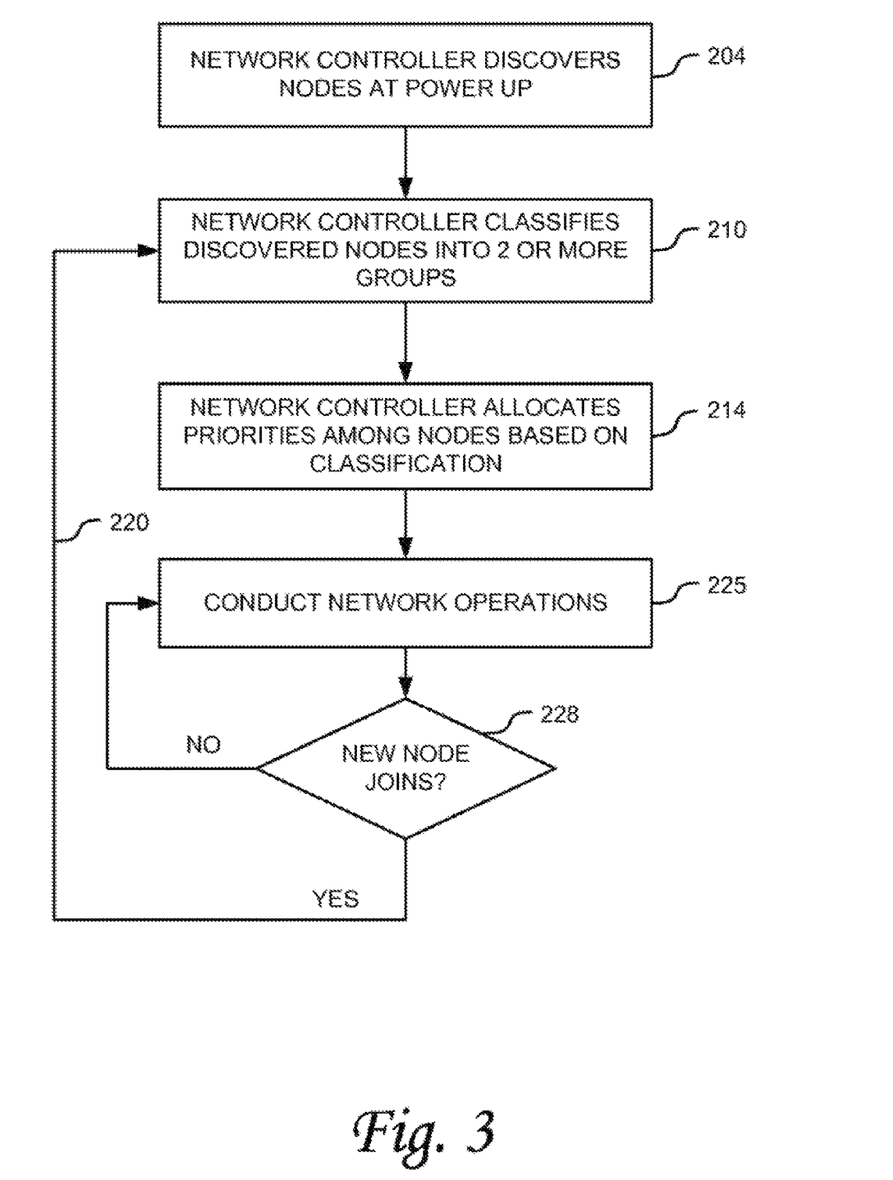
FIG. 3 is a diagram illustrating and example process for hierarchical priority assignment in accordance with one embodiment of the systems and methods described herein.

FIG. 3 is a diagram illustrating and example process for hierarchical priority assignment in accordance with one embodiment of the systems and methods described herein. Referring now to FIG. 3, at operation 204 a network is powered up. At power up the network controller discovers nodes registered to the network. As is typical with a MoCA network there may be a plurality of different nodes. Examples of different nodes can include nodes such as a Digital Video Recorder (DVR), a Set-top Box (STB), an Ethernet MoCA (or Coax) Bridge (ECB), a Video-on-Demand (VoD) node, a Broadband Home Router (BHR), and so on. Some of these nodes are provided by a Multiple Service Operator (MSO), others are retail devices.

At operation 210, the NC classifies all network nodes into 2 or more classifications. A network policy can be defined in advance instructing the NC as to the proper classification of network nodes. For example, in one embodiment the network nodes can be grouped into two classes: MSO nodes and Non-MSO nodes. As another example, nodes can be group into three classes: VoD-Flow nodes, DVR-Flow node and ECB nodes. As these examples illustrate, in yet another embodiment, any of a number of other groupings can be defined.

At operation 214, the NC allocates node priorities based on the classification. Any of a number of assignment criteria can be used to assign a priority to a given node. For example, nodes can be assigned a priority based on the type or sensitivity of traffic they typically carry. For example, in one embodiment, the NC grants a higher priority to MSO devices (and hence, to MSO traffic) and a lower priority to non-MSO devices. In such a scenario, MSO traffic between an MSO Rx and an MSO Tx receives a higher priority than non MSO traffic regardless of the individual flow RR priority. As another example, for BHR flows, all traffic between the BHR and the STB/DVR are assigned a higher priority; all traffic between the DVR and the STB/DVR are also the higher priority; and traffic between the ECB and other nodes are low priority. As yet another example, an additional level of priority can be introduced such as where DVR flows are differentiated from BHR as the NC. In this example, the NC can implement node-level preemption of BHR flows over DVR flows when there is a conflict. As noted elsewhere, in various embodiments, VLAN tag priorities and/or DSCP priorities can be applied to these examples to add a further level of prioritization below the node-level priorities.

At operation 225, network operations are conducted. Typically, registered nodes will send RRs to the NC to request transmission slots in an upcoming MAP cycle. The NC assigns transmission slots to the requesting nodes based on the priorities. As described in further detail below, in one embodiment the NC first makes bandwidth assignments on a node-by-node basis to the node or nodes starting with the highest priority node. Any remaining bandwidth is allocated in priority order to the remaining nodes until the allocable bandwidth is consumed. If a given node does not receive a sufficient bandwidth allocation, for the bandwidth assigned to that node, the NC allocates that bandwidth to RRs for that node based on the relative priorities of these RRs. For the nodes with the same node-level priority, their RRs are allocated on a round-robin basis within the same traffic level priority.

At operation 228, if a new node joins the network, the NC clarifies that node into the prioritization scheme for the network. This is shown by flow line 220 and operation 210. Having been properly classified, the new node can send RRs to the NC and participate in network operations.

Figure 4:
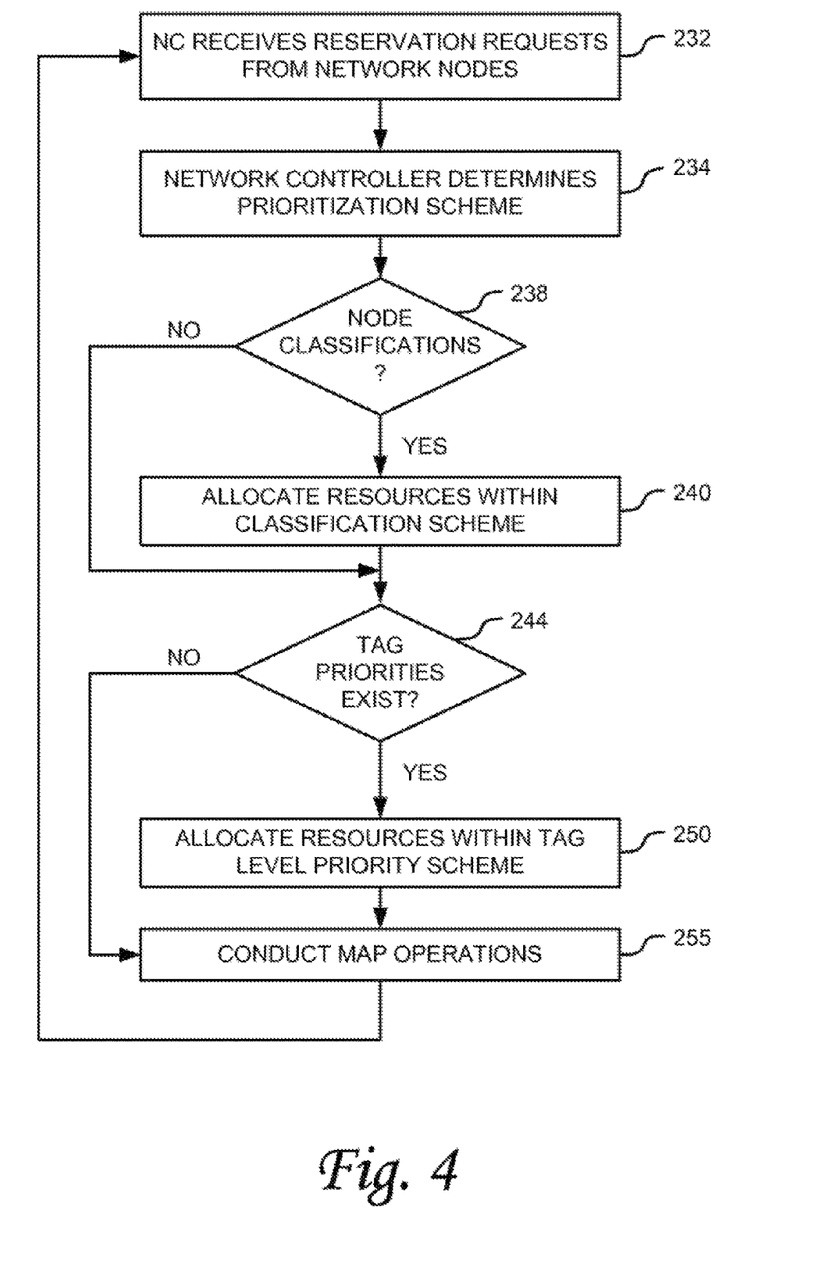
FIG. 4 is a diagram illustrating an example process for locating network resources with a node classification scheme in accordance with one embodiment of the systems and methods described herein.

FIG. 4 is a diagram illustrating an example process for allocating network resources with a node classification scheme in accordance with one embodiment of the systems and methods described herein. FIG. 4 illustrates one example of the conduct of network operations as referenced by operation 225 of FIG. 3. Referring now to FIG. 4, at operation 232 the NC receives RRs from the nodes of the network for an upcoming MAP cycle. As noted above, the RRs are sent by the network nodes to the NC to request transmission slots. In some instances, the RRs can include tags indicating a QoS priority.

At operation 234 the NC determines the relative priorities for the RRs received for a given MAP cycle. For example, in one embodiment the NC determines whether there are any node level priorities, and also whether there are any RR priorities within a given node. If node priorities exist, the NC allocates available network bandwidth to the node or nodes with the highest priority first. If there is remaining bandwidth, that remaining bandwidth is allocated to lower priority nodes on a priority basis. This illustrated by operations 238 and 240. Within the nodes with the same node-level priority, the bandwidth allocations are done first for the RRs of the highest priority, then the next level of priority, and at last the lowest level priority. Within each RR priority level, the allocations are done on a round-robin basis or based on relative priorities of the nodes within that level.

An example of RR priorities is prioritization based on VLAN tags or the DSCP field. Tags such as a VLAN tag and DSCP field can be used to assign priorities to RRs for given flows. The MoCA 1.0, 1.1 and MoCA 2.0 specifications defines how to map tag information into RR priorities. Within a given node, the NC allocates transmission bandwidth in accordance with the RR priorities for each packet. This is illustrated by operations 244 and 250.

At operation 255, the MAP communications are conducted by the network devices. The operation resumes at step 232 for the next MAP cycle.

Figure 5:
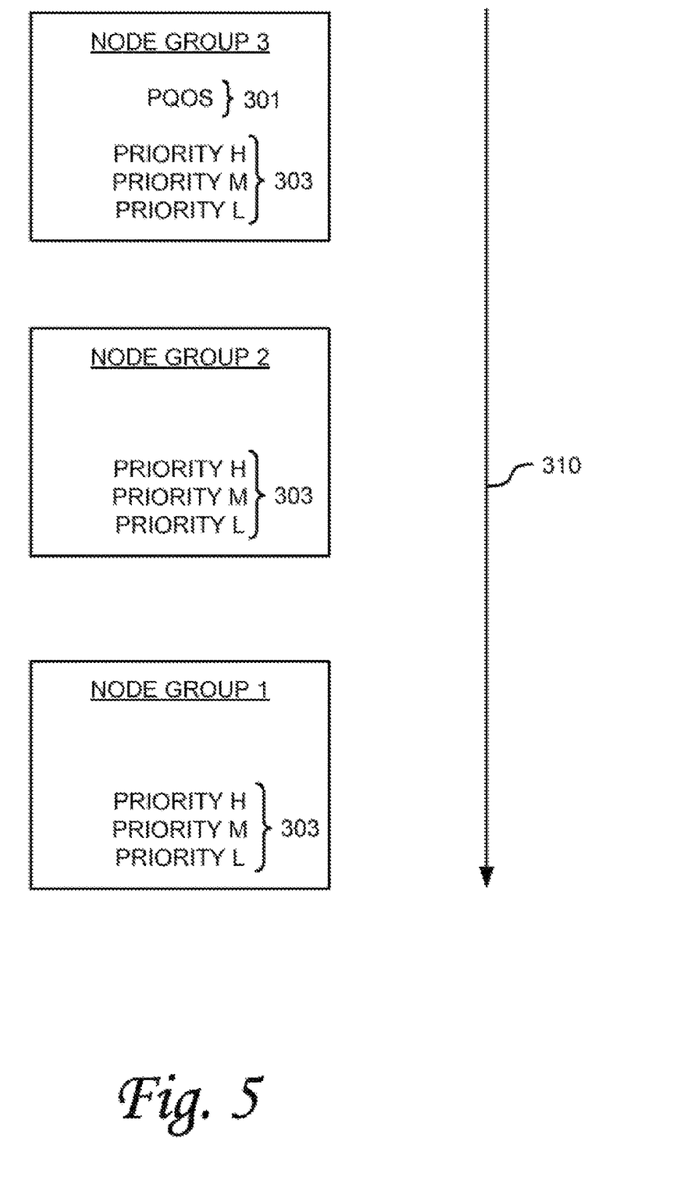
FIG. 5 is a diagram illustrating an example of a prioritization scheme in accordance with one embodiment of the systems and methods described herein.

FIG. 5 is a diagram illustrating an example of a prioritization scheme in accordance with one embodiment of the systems and methods described herein. Referring now to FIG. 5, the illustrated example shows three node groups. Node Group 1, Node Group 2 and Node Group 3. Accordingly, there are three priority classifications in this schema. The arrow 310 illustrates the descending order of priority of this schema from Node Group 3 to Node Group 1. In this example, Node Group 3 is the highest priority group of one or more nodes and accordingly, the nodes in that group are allocable as PQoS nodes. In addition to being able to support PQoS flows 301, Node Group 3 can support QoS flows 303. In the illustrated example, Node Group 3 uses VLAN tags, so the QoS flows 303 can be priorities as High, Medium and Low priority QoS flows 303.

Node Group 2 is the next highest priority group of one or more nodes. Accordingly, remaining bandwidth after allocation to the one or more nodes of Node Group 3 would first be allocated to nodes in Node Group 2. As illustrated in this example, Node Group 2 is a lower priority group than Node Group 3 and it is not a PQoS node. Node Group 2 however can support QoS flows 303. In the illustrated example, Node Group 2 uses VLAN tags, so the QoS flows 303 can have priorities set as High, Medium and Low priority QoS flows 303. Because Node Group 2 is lower in priority than Node Group 3, bandwidth for the upcoming MAP cycle that is remaining after Node Group 3 has been given its allocation is made available to Node Group 2 for its RRs.

Node Group 1 is the next highest priority group of one or more nodes. Accordingly, remaining bandwidth after allocation to the one or more nodes of Node Groups 3 and 2 would next be allocated to nodes in Node Group 1. As illustrated in this example, Node Group 1 is a lower priority group than Node Groups 3 and 2, and it is not a PQoS node. Node Group 1, however, can support QoS flows 303. In the illustrated example, Node Group 1 uses VLAN tags, so the QoS flows 303 can have priorities set as High, Medium and Low priority QoS flows 303. Because Node Group 1 is lower in priority than Node Groups 3 and 2, bandwidth for the upcoming MAP cycle that is remaining after Node Group 3 has been given its allocation, and Node Group 2 has been given its allocation (if any) is made available to Node Group 1 for its RRs.

Allocation within the node groups in this and other embodiments can be on a round robin basis, or can be done based on relatively priorities of nodes within a given node group.

Figure 6:
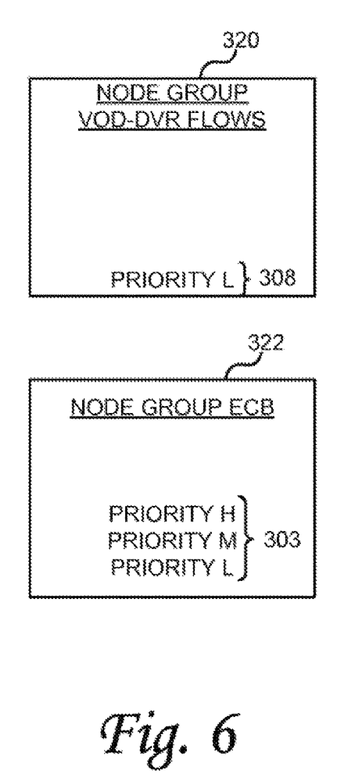
FIG. 6 is a diagram illustrating another example of network node prioritization in accordance with one embodiment of the systems and methods described herein.

FIG. 6 is a diagram illustrating another example of network node a prioritization in accordance with one embodiment of the systems and methods described herein. Referring now to FIG. 6, in this example the nodes are classified into two groups for node prioritization purposes. A first group, the highest priority group 320 in this example, is a group of devices supporting either video-on-demand flows or home DVR flows or both. In the illustrated example, priority group 320 is the highest priority and therefore receives its bandwidth allocation before lower priority groups. In this example, however, priority group 320 does not use tags to support prioritized QoS. Accordingly, in one embodiment, all of the RRs for nodes in bus group 320 are mapped to a low priority 308 in accordance with MoCA 1.x.

The second group of one or more nodes is an Ethernet to Coax (or MoCA) Bridge group 322. As illustrated in this example, group 322 a lower priority group than group 320, and it is not a PQoS node. Group 322 in this example, however, can support QoS flows 303. In the illustrated example, group 322 uses 322 uses VLAN tags, so the QoS flows 303 can have priorities set as High, Medium and Low priority QoS flows 303. Because group 322 is lower in priority than group 320, bandwidth for the upcoming MAP cycle that is remaining after group 320 has been given its allocation, is made available to group 322 for its RRs. Note that in this example, no PQoS flows are supported and this is compatible with MoCA 1.x.

Figure 7:
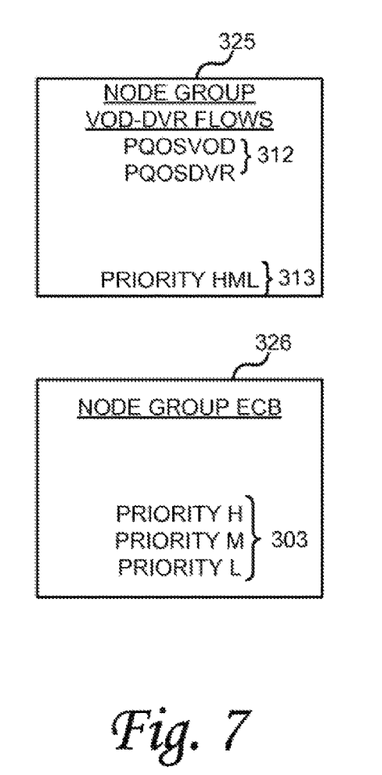
FIG. 7 is a diagram illustrating yet another example of network node prioritization in accordance with one embodiment of the systems and methods described herein.

FIG. 7 is a diagram illustrating yet another example of network node a prioritization in accordance with one embodiment of the systems and methods described herein. Referring now to FIG. 7, in this example the nodes are classified into two groups for node prioritization purposes. A first group, the highest priority group 325 in this example, is a group of devices that support either video-on-demand flows or DVR flows or both. In the illustrated example, priority group 325 is the highest priority and therefore receives its bandwidth allocation before lower priority groups. In this example, group 325 supports PQoS flows 312. More particularly, in this example, the PQoS flows supported are differentiated as PQoS video on demand service and PQoS DVR service. Note that in this example, all packets are tagged correctly, in compliance with the MoCA 1,x specification. Each VOD flow and each DVR flow is set up through the PQoS flow admission process. Also shown in this example, VOD flows can be given a higher priority than the DVR flows, so that in the event there is not enough network bandwidth for a new VOD flow, the NC can preempt an existing DVR flow to accommodate the VOD flow. Still further, in this example priority group 325 uses tags so that nodes in group 325 can support prioritized QoS. Therefore, the RRs can have priorities set as High, Medium and Low priority QoS flows 313.

The second group of one or more nodes is an Ethernet to Coax (or MoCA) Bridge group 326. As illustrated in this example, group 326 is a lower priority group than group 325, and it is not a PQoS node. Group 326 in this example, however, can support QoS flows 303. In the illustrated example, group 326 uses VLAN tags, so the QoS flows 303 can have priorities set as High, Medium and Low priority QoS flows 303. Because group 326 is lower in priority than group 325, bandwidth for the upcoming MAP cycle that is remaining after group 325 has been given its allocation, is made available to group 326 for its RRs.

Note that the primary difference between the examples illustrated in FIGS. 6 and 7 is that the example of FIG. 7 uses tags to prioritize QoS and PQoS flows, while the example of FIG. 6 does not use tags in some nodes. However, as these examples illustrate, even in the absence of tags (whether or not by design), the example of FIG. 6 can still achieve performance advantages by virtue of the relative prioritization assigned to the different node groups 320, 322. As this illustrates, tags or other forms of RR prioritization may be avoided and priority still given to the RRs or flows in critical nodes provided those nodes are designated as having a proper level of node priority. Another difference between the examples illustrated in FIGS. 6 and 7 is that the example of FIG. 7 differentiates 2 PQoS levels within the highest priority nodes: PQoS VOD flows vs. PQOS DVR flow; and PQOS VOD flows may preempt PQOS DVR flows in the event there is insufficient bandwidth for all PQoS flows.

Figure 8:
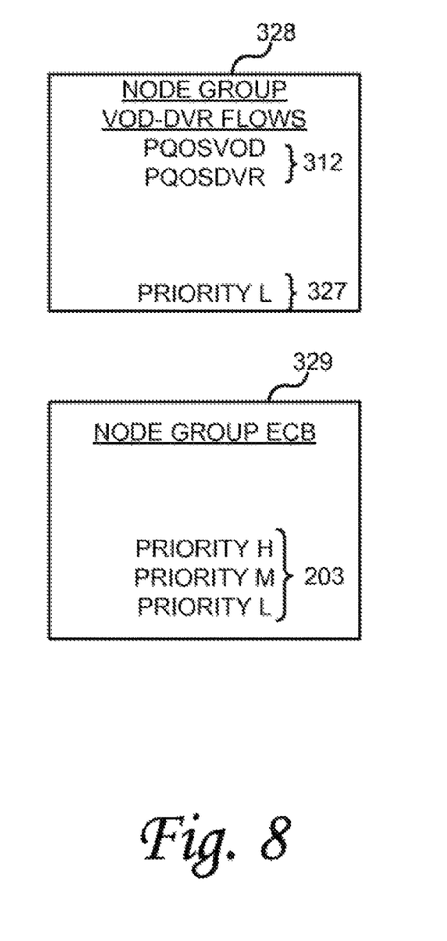
FIG. 8 is a diagram illustrating still another example of node prioritization in accordance with one embodiment of the systems and methods described herein.

FIG. 8 is a diagram illustrating yet another example of node prioritization in accordance with one embodiment of the systems and methods described herein. Referring now to FIG. 8, in this example the nodes are classified into two groups for node prioritization purposes. A first group, the highest priority group 328 in this example, is a group of devices that support either video-on-demand flows or DVR flows or both. In the illustrated example, priority group 328 is the highest priority and therefore receives its bandwidth allocation before lower priority groups. Similar to the example of FIG. 7, in this example, group 328 supports PQoS flows 312. Likewise in this example, the PQoS flows 312 supported are differentiated into the PQoS video on demand service and a PQoS DVR service. VOD and DVR flows are admitted with the regular PQoS flow admission process compliant with MoCA 1.1. Note that in this example, VOD flows are given higher priority than the DVR flows and can preempt DVR flows in order to admit a new VoD flow. Also note, in this example priority group 328 does not use tags for the RRs, so nodes in group 328 cannot support prioritized QoS. Therefore, the RRs are all mapped to Low priority QoS flows 327.

Figure 9:
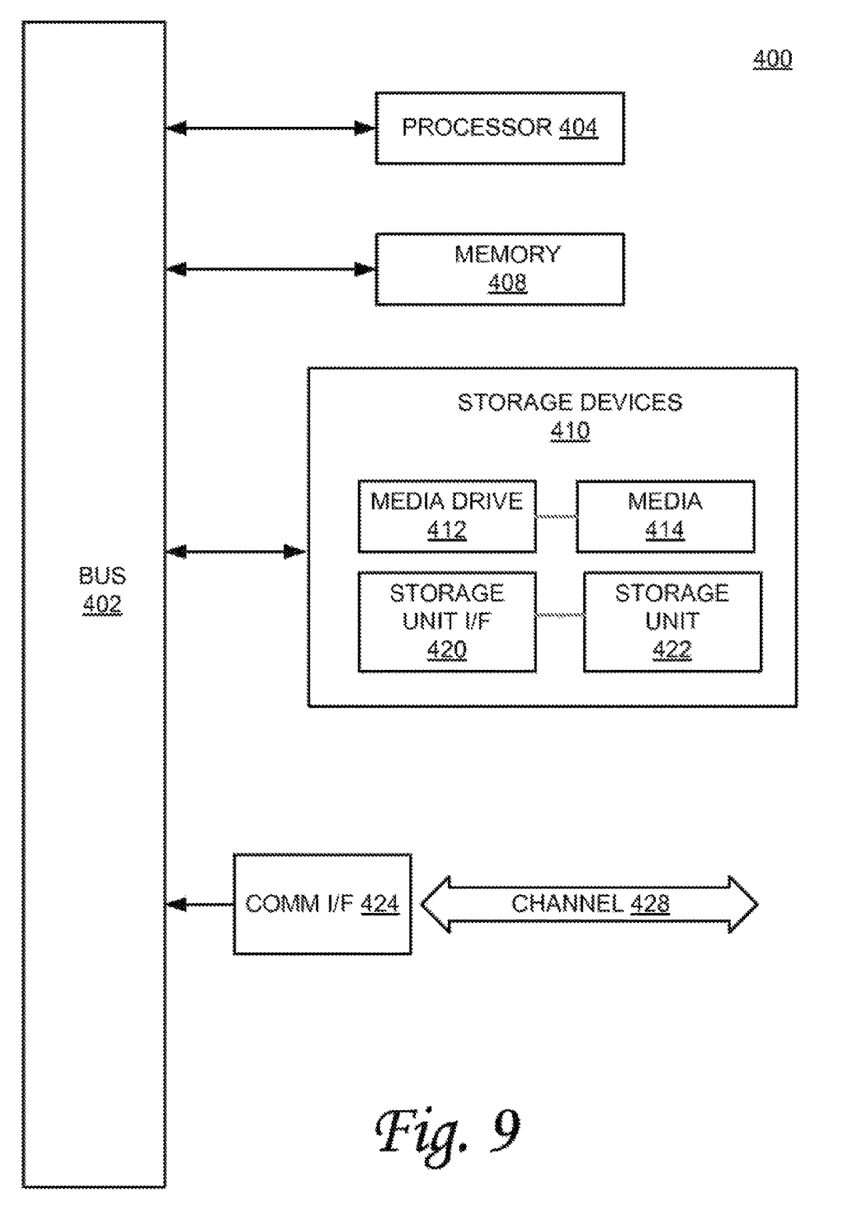
FIG. 9 is a diagram illustrating an example computing module that may be used in implementing various features of embodiments of the disclosed systems and methods.

The second group of one or more nodes is an Ethernet Coax (or MoCA) Bridge group 329. As illustrated in this example, group 329 is a lower priority group than group 328, and it is not a PQoS node. Group 329 in this example, however, can support QoS flows 303. In the illustrated example, group 329 uses VLAN tags, so the QoS flows 303 can have priorities set as High, Medium and Low priority QoS flows 303. Because group 329 is lower in priority than group 328, bandwidth for the upcoming MAP cycle that remaining after group 328 has been given its allocation, is made available to group 329 for its RRs.

Where components or modules of the invention are implemented in whole or in part using software, in one embodiment, these software elements can be implemented to operate with a computing or processing module capable of carrying out the functionality described with respect thereto. One such example computing module is shown in FIG. 9. Various embodiments are described in terms of this example-computing module 400. After reading this description, it will become apparent to a person skilled in the relevant art how to implement the invention using other computing modules or architectures.

Referring now to FIG. 8, computing module 400 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 400 might also represent computing capabilities embedded within or otherwise available to a given device. For example, a computing module 400 might be found in electronic devices suck as, for example, digital cameras, navigation systems, cellular telephones, portable computing devices, modems, routers, wireless access points (WAPs), terminals and other electronic devices that might include some form of processing capability.

Computing module 400 might include, for example, one or more processors, controllers, control modules, or other processing devices, such as a processor 404. Processor 404 might be implemented using a general-purpose or special-purpose processing engine such as, for example, a microprocessor, controller, or other control logic. In the illustrated example, processor 404 is connected to a bus 402, although any communication medium can be used to facilitate interaction with other components of computing module 480 or to communicate externally.

Computing module 400 might also include one or more memory modules, simply referred to herein as main memory 408. For example, preferably random access memory (RAM) or other dynamic memory, might be used for storing information and instructions to be executed by processor 404. Main memory 408 might also be used for stormy temporary variables or other intermediate information during execution of instructions to be excused by processor 404. Computing module 400 might likewise include a read only memory ("ROM") or other static storage device coupled to bus 402 for storing static information and instructions for processor 404.

The computing module 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a floppy disk drive, a magnetic tape drive, an optical disk drive, a CD or DVD drive (R or RW), or other removable or fixed media drive might be provided. Accordingly, storage media 414 might include, for example, a hard disk, a floppy disk, magnetic tape, cartridge, optical disk, a CD or DVD, or other fixed or removable medium that is read by, written to or accessed by media 412. As these examples illustrate, the storage media 414 can include a computer usable storage medium having stored therein computer software or data.

In alternative embodiments, information storage mechanism 410 might include other similar instrumentalities for allowing computer programs or other instructions or data to be loaded into computing module 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory module) and memory slot, a PCMCIA slot and card, and other fixed or removable storage units 422 and interfaces 420 that allow software and data to be transferred from the storage unit 422 to computing module 400.

Computing module 400 might also include a communications interface 424. Communications interface 424 might be used to allow software and data to be transferred between computing module 400 and external devices. Examples of communications interface 424 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 424 might typically be carried on signals, which can be electronic, electromagnetic (which includes optical) or other signals capable of being exchanged by a given communications interface 424. These signals might be provided to communications interface 424 via a channel 428. This channel 428 might carry signals and might be implemented using a wired or wireless communication medium. Some examples of a channel might include a MoCA channel over coaxial cable, phone line, a cellular link, an RF link, an optical link, a network interface, a local or wide area network, and other wired or wireless communications channels.

In this document, the terms "computer program medium" and "computer usable medium" are used to generally refer to physical storage media such as, for example, memory 408, storage unit 420, and media 414. These and other various forms of computer program storage media or computer usable storage media may be involved in storing and providing one or more sequences of one or more instructions to a processing device for execution. Such instructions embodied on the medium, are generally referred to as "computer program code" or a "computer program product" (which may be grouped in the form of computer programs or other groupings). When executed, instructions might enable the computing module 400 to perform features or functions of the disclosed method and apparatus as discussed herein. While various embodiments of the disclosed method and apparatus have been described above, it should be understood that they have been presented by way of example only, and not of limitation. Likewise, the various diagrams may depict an example architectural or other configuration for the disclosed method and apparatus, which is done to aid in understanding the features and functionality that can be included in the disclosed method and apparatus. The claimed invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the disclosed method and apparatus. Also, a multitude of different constituent module names other than those depicted herein can be applied to the various partitions. Additionally, with regard to flow diagrams, operational descriptions and method claims, the order in which the blocks are presented herein shall not mandate that various embodiments be implemented to perform the recited functionality in the same order unless the context dictates otherwise.

Although the disclosed method and apparatus is described above in terms of various exemplary embodiments and implementations, it should be understood that the various features, aspects and functionality described in one or more of the individual embodiments are not limited in their applicability to the particular embodiment with winch they are described, but instead can be applied, alone or in various combinations, to one or more of the other embodiments of the disclosed method and apparatus, whether or not such embodiments are described and whether or not such features are presented as being a part of a described embodiment. Thus, the breadth and scope of the claimed invention should not be limited by any of the above-described embodiments which are presented as mere examples for illustration only.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional" "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:
1. A system, the system comprising:
a communication processor; and a computer executable program code embodied on a non-transitory computer readable medium, the computer executable program code configured to cause the communication processor to perform operations of the executable program code comprising:
classifying each of a plurality of devices according to a device priority; receiving communication requests from one or more devices of the plurality of devices, wherein each communication request requires bandwidth; and
allocating bandwidth to the one or more devices of the plurality of devices in response to the communication requests, wherein the bandwidth allocation is based on the device priority, and wherein the device with the highest priority level is allocated bandwidth according to a quantified measure of quality, and wherein the one or more devices other than the device having the highest priority level are not allocated bandwidth according to the quantified measure of quality.

2. The system of claim 1, wherein a Digital Video Recorder (DVR) is classified with the highest priority level.

3. The system of claim 1, wherein a Set-top Box (STB) is classified with the highest priority level.

4. The system of claim 1, wherein an Ethernet bridge is classified with a low priority level.

5. The system of claim 1, wherein the operations of the executable program code comprises determining whether a sufficient bandwidth allocation is available to meet the quantified measure of quality.

6. The system of claim 1, wherein the plurality of devices operates in a multimedia network over coaxial cable.

7. The network device of claim 1, wherein a video streaming device is classified with the highest priority level.

8. The system of claim 1, wherein the quantified measure of quality is based on a parameterized quality of service flow.

9. The system of claim 1, wherein the classification is performed based on device type.

10. The system of claim 1, wherein a Video-on-Demand (VoD) device is classified with the highest priority level.

11. A system, the system comprising:
a network device configured to communicate a plurality of data packets to and from at least one device on an internal network, wherein the network device is configured to communicate the plurality of data packets to and from at least one device on an external network; and
a computer processor configured to execute operations stored in non-volatile memory, the operations comprising:
communicating a first data flow with a low priority device at a first bandwidth level,
identifying one or more data flows to a high priority device to detect a second bandwidth value, wherein the high priority device is identified from communications with the internal network and the external network,
assigning one or more time slots in an upcoming communication window to the at least one device in the internal network and the at least one device in the external network in response to the one or more data flows,
allocating the second bandwidth value to the high priority device according to one or more quantified measures of quality for the high priority device, and
adjusting the first bandwidth value as a result of allocating the second bandwidth value, wherein the first bandwidth value is variable and is not allocated according to the one or more quantified measures of quality.

12. The system of claim 11, wherein a Digital Video Recorder (DVR) is the high priority device.

13. The system of claim 11, wherein a Set-top Box (STB) is the high priority device.

14. The system of claim 11, wherein an Ethernet bridge is the low priority device.

15. The system of claim 11, wherein the operations comprise determining whether a sufficient bandwidth allocation is available to meet a quantified measure of quality.

16. The network device of claim 11, wherein the one or more data flows to the high priority device are identified as video streaming data packets.

17. The system of claim 11, wherein the low priority device and the high priority device operate in a multimedia network over coaxial cable.

18. The system of claim 11, wherein the one or more quantified measures of quality are based on a parameterized quality of service flow.

19. The system of claim 11, wherein the high priority device is classified according to a device type.

20. The system of claim 11, wherein a Video-on-Demand (VoD) device is the high priority device.

* * * * *